United States Patent [19]

Cameron

[11] Patent Number: 4,755,788
[45] Date of Patent: Jul. 5, 1988

[54] POTENTIOMETRIC IMPLEMENTATION OF UNAMBIGUOUS AUTOMOTIVE BRAKE SIGNAL LIGHTS

[76] Inventor: David L. Cameron, 620 Hamlet Dr., Port Orange, Fla. 32019

[21] Appl. No.: 90,361

[22] Filed: Aug. 28, 1987

[51] Int. Cl.$^4$ .............................................. B60Q 1/26
[52] U.S. Cl. ....................................... 340/71; 340/67; 340/69; 340/74
[58] Field of Search ............................. 340/71, 72–74, 340/66, 67, 69, 82, 84, 87; 307/10 LS

[56] References Cited

U.S. PATENT DOCUMENTS

| | | | |
|---|---|---|---|
| 2,091,086 | 8/1937 | Taylor | 340/74 |
| 2,691,744 | 10/1954 | Peters | 340/66 |
| 3,096,505 | 7/1963 | Richins | 340/71 |
| 3,528,056 | 9/1970 | Voevodsky | 340/72 |
| 4,149,141 | 4/1979 | Tanimura | 340/71 |

Primary Examiner—Donnie L. Crosland

[57] ABSTRACT

Confusion of red colored automotive brake signal lights with other red lights delays perception of the brake signal. Perceptibility of the brake signal is improved when red colored lights are displayed only during braking, non-red colored lights being displayed at appropriate other times. The current invention effects this color distinction by interposing, during braking, low electric resistance into electric circuits between a source of electrical energy and lamps effecting red colored light, and interposing high electric resistance into electric circuits between said source of electrical energy and lamps effecting non-red colored light, and further, by interchanging the said interposed electric resistances when the brake actuation means is not actuated, flow of energizing electric current being sufficient to effect illumination of said lamps only in the case that said interposed electric resistance is low.

1 Claim, 1 Drawing Sheet

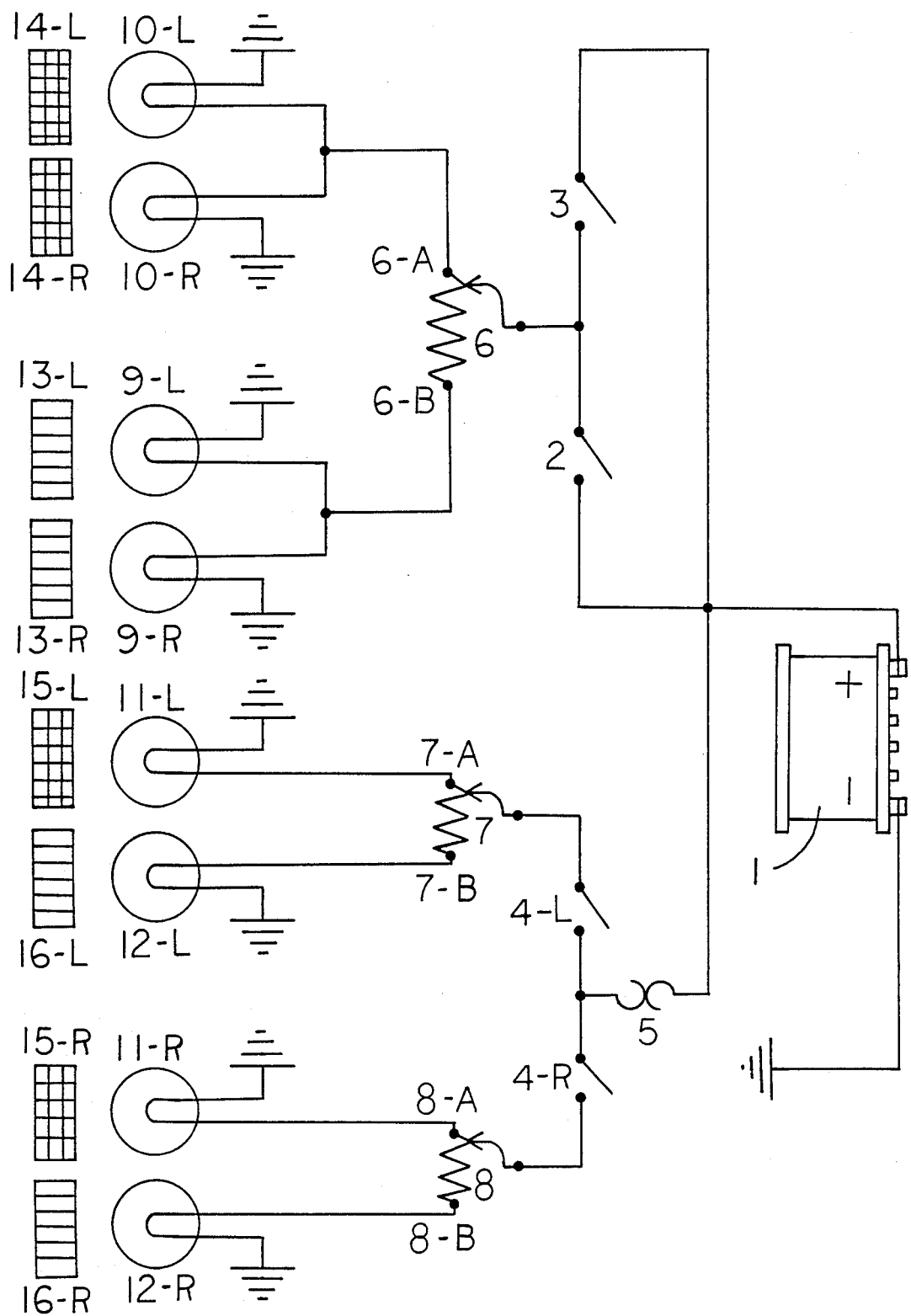

POTENTIOMETRIC IMPLEMENTATION OF UNAMBIGUOUS AUTOMOTIVE BRAKE SIGNAL LIGHTS

The current invention comprises further development of automotive rear lighting systems in which red colored light, and only red colored light, is displayed during braking, tail lights and rear turn signal lights being non-red in color, the first such system being described in U.S. Pat. No. 4,661,795, said system employing electric switching means to effect appropriately colored rear lights, and an additional such system being described in patent application Ser. No. 07/066,211, said additional system employing mechanical or electro-mechanical means to effect said color distinction.

BACKGROUND OF THE INVENTION

The current invention pertains generally to automotive rear lighting systems employing differently colored lights to perform different functions, and especially to rear lighting systems in which red colored light, and only red colored light, is displayed during braking, and in which non-red colored light, and only non-red colored light, can be displayed at other times. The purpose of the said color distinction is to make display of red colored light per se an unambiguous, immediately perceptible signal of braking, and thereby to reduce the incidence of rear-end automotive vehicle collision, delayed perception of the brake signal being a significant contributing factor in many of said rear-end collisions.

Various means are available by which the said color distinction can be implemented. In a previously described rear lighting system (Cameron, U.S. Pat. No. 4,661,795), spring-loaded electric switching means, actuated by actuation of brake actuation means, close electric circuits between a source of electrical energy and lamps effecting red colored light, and open electric circuits between said source of electrical energy and lamps effecting non-red colored light, said switching actions being reversed when said brake actuation means is released. Alternative means are described in patent application Ser. No. 07/066,211, said alternative comprising mechanical and electro-mechanical means whereby all light emanating toward the rear from illuminated lamps is caused to be transmitted, during braking, through material containing a red colored pigment, and further, caused to be transmitted at other times through material containing a non-red colored pigment.

The current invention employs potentiometric means to alternatively interpose high electric resistance or low electric resistance into electric circuits between a source of electrical energy and rear lamps effecting red colored light and rear lamps effecting non-red colored light, flow of energizing electric current sufficient to effect illumination of a given lamp being enabled by interposition of low electric resistance, but being prevented by interposition of high electric resistance. During braking, there is low electric resistance in electric circuits to lamps effecting red colored light, and high electric resistance in electric circuits to lamps effecting non-red colored light. When the brake actuation means is not actuated, there is high electric resistance in electric circuits to lamps effecting red colored light, and low electric resistence in electric circuits to lamps effecting non-red colored light. Thus, lamps effecting red colored light can be illuminated only during braking, and lamps effecting non-red colored light can be illuminated only when the brake actuation means is not actuated.

SUMMARY OF THE INVENTION

A rear lighting system for automotive vehicles is described in which actuation of the brake actuation means actuates electric switching means to close electric circuits between a source of electrical energy and lamps effecting red colored light, said actuation of said brake actuation means further actuating potentiometric means to minimize the electric resistance in the said closed electric circuits, said minimization of said electric resistance enabling sufficient energizing electric current to flow through said rear lamps to effect their maximal illumination, light emanating from the rear of said vehicle being visible as red colored light, the display of red colored light at the rear of said vehicle comprising an absolute signal of braking.

An additional object of the rear lighting system is to provide potentiometric means, actuated by actuation of said brake actuation means, to maximize electric resistance in electric circuits to lamps effecting non-red colored light, said maximized electric resistance preventing flow of energizing electric current sufficient to effect illumination of said rear lamps, thereby preventing display of non-red colored light during braking.

A further object is to provide potentiometric means to interpose, in the case that said brake actuation means is not actuated, maximized electric resistance into electric circuits to lamps effecting red colored light, said maximized electric resistance preventing flow of energizing electric current sufficient to effect illumination of said lamps, thereby preventing display of red colored light when said brake actuation means is not actuated.

A further object is to provide potentiometric means to interpose, in the case that said brake actuation means is not actuated, minimized electric resistance into electric circuits to lamps effecting non-red colored light, said minimized electric resistance allowing, in the case that said electric circuits to said lamps are closed, flow of energizing electric current sufficient to effect illumination of said lamps, thereby enabling display of non-red colored light when said brake actuation means is not actuated.

These and additional implied objects are accomplished by the current invention, comprising: rear lamps illuminated to effect red colored light, and rear lamps illuminated to effect non-red colored light, the electric circuit between each of said lamps and a source of electrical energy including electric resistance continuously variable from a minimal value, said minimal resistance allowing sufficient energizing electric current to flow through said electric circuits to effect maximal illumination of said lamps, to a maximal value, said maximal resistance preventing flow of energizing electric current through said electric circuits sufficient to effect illumination of said lamps, the magnitude of said electric resistance in the electric circuit to each of said lamps being determined by spring-loaded potentiometric means, said potentiometric means being actuated by actuation of the brake actuation means of the automotive vehicle.

BRIEF DESCRIPTION OF THE DRAWING

To illustrate and explain the invention, the FIGURE discloses an embodiment which may, in some applications, be preferred, it being understood, however, that the invention is not limited to the precise forms shown.

The FIGURE is a schematic diagram illustrating incorporation of a given embodiment of the invention into the rear lighting system of an automotive vehicle, said embodiment comprising: lamps illuminated to effect tail lights and rear turn signal lights, light emanating toward the rear from said illuminated lamps being transmitted through material containing a non-red colored pigment, and lamps illuminated to effect the brake signal lights, light emanating toward the rear from said illuminated lamps being transmitted through material containing a red colored pigment; electric switching means to close electric circuits between said lamps and a source of electrical energy; and, spring-loaded potentiometric means in each of said electric circuits, said potentiometric means interposing electric resistance, continuously variable from a minimum value to a maximum value, into each of said electric circuits.

DETAILED DESCRIPTION

Illumination of lamps at the rear of an automotive vehicle is effected by flow of energizing electric current from a source of electrical energy 1, said flow of energizing electric current being effected by closure of electric circuits having low electric resistance between said lamps and said source of electrical energy 1. The electrical components of the rear lighting system illustrated by the FIGURE are shown in their normal positions, there being no illumination of rear lamps when said components are in said normal positions. In the case that spring-loaded brake light switch 2 is actuated by actuation of the brake actuation means of the vehicle, said actuation of said brake actuation means further actuating spring-loaded potentiometric means 6, 7, and 8, said potentiometric means then making electrical contacts at 6-B, 7-B, and 8-B, respectively, there are closed electric circuits between said source of electrical energy 1 and lamps 9-L, 9-R, 10-L, and 10-R, said lamps 9-L and 10-L being positioned on the left rear of said vehicle, and said lamps 9-R and 10-R being positioned on the right rear of said vehicle, electric resistance in said closed electric circuits to said lamps 9-L and 9-R being minimized by said actuation of said potentiometric means 6, said minimization of said electric resistance allowing sufficient energizing electric current to flow through said lamps 9-L and 9-R to effect maximal illumination of the said lamps, light emanating toward the rear from said illuminated lamps 9-L and 9-R being transmitted through translucent screens 13-L and 13-R, said translucent screens containing a red colored pigment, said pigment causing said light to be further transmitted as red colored light; and further, electric resistance in said closed electric circuits to said lamps 10-L and 10-R being maximized by said actuation of said potentiometric means 6, said maximization of said electric resistance minimizing flow of energizing electric current through said lamps 10-L and 10-R, said minimized current flow being insufficient to effect illumination of said lamps 10-L and 10-R. Thus, when said brake actuation means is actuated, red colored light, and only red colored light, is displayed at the rear of the vehicle. When said brake actuation means is released, said release allowing said spring-loaded brake light switch 2 and said spring-loaded potentiometric means 6, 7, and 8 to return to their normal positions, said return opening electric circuits between rear lamps and said source of electrical energy 1, thereby terminating flow of energizing electric current through, and illumination of, said lamps 9-L and 9-R. Thus, when said brake actuation means is released, red colored brake signal lights are extinguished.

In the case that tail light switch 3 is actuated, and all other electrical components are in their normal positions, there are closed electric circuits between said source of electrical energy 1 and rear lamps 9-L, 9-R, 10-L, and 10-R, electric resistance in said closed electric circuits to said lamps 10-L and 10-R being minimized by said potentiometric means 6, said potentiometric means making electrical contact at 6-A, said minimization of said electric resistance allowing sufficient energizing electric current to flow through said lamps 10-L and 10-R to effect maximal illumination of said lamps, light emanating toward the rear from said illuminated lamps 10-L and 10-R being transmitted through translucent screens 14-L and 14-R, said translucent screens containing a non-red colored pigment, said pigment causing said light to be further transmitted as non-red colored light; and further, said electric resistance in said closed electric circuits to said lamps 9-L and 9-R being maximized by said potentiometric means 6, said maximization of said electric resistance minimizing flow of energizing electric current through said lamps 9-L and 9-R, said minimized current flow being insufficient to effect illumination of said lamps 9-L and 9-R. Thus, when only tail light switch 3 is actuated, non-red colored tail lights, and only non-red colored tail lights, are displayed at the rear of the vehicle. In the case that the brake actuation means is then actuated, said actuation actuating brake light switch 2 and said potentiometric means 6, 7, and 8, there remain closed electric circuits between said source of electrical energy 1 and said rear lamps 9-L, 9-R, 10-L, and 10-R, electric resistance in said closed electric circuits to said lamps 10-L and 10-R being maximized by actuation of potentiometric means 6, said maximization of said electric resistance minimizing flow of energizing electric current through said lamps 10-L and 10-R, said minimized current flow being insufficient to effect illumination of said lamps 10-L and 10-R; and further, electric resistance in said closed electric circuits to said lamps 9-L and 9-R being minimized by actuation of said potentiometric means 6, said minimization of said electric resistance allowing sufficient energizing electric current to flow through said lamps 9-L and 9-R to effect maximal illumination of said lamps, light emanating toward the rear from said illuminated lamps 9-L and 9-R being transmitted through material containing a red colored pigment. Thus, when the brake actuation means is actuated, the non-red colored tail lights are extinguished, and red colored brake signal lights are illuminated. When the brake actuation means is released, said brake light switch 2 and said potentiometric means 6, 7, and 8 return to their normal positions, said return of said potentiometric means 6 minimizing electric resistance in closed electric circuits to lamps 10-L and 10-R, said minimization of said electric resistance enabling flow of energizing electric current to again effect maximal illumination of said lamps 10-L and 10-R, and further, said return maximizing electric resistance in electric circuits to said lamps 9-L and 9-R, said maximized electric resistance preventing flow of energizing electric current sufficient to effect illumination of said lamps 9-L and 9-R. Thus, when said brake actuation means is released, the red colored brake signal lights are extinguished, and the non-red colored tail lights are re-illuminated.

In the case that right turn selector switch 4-R is actuated, and all other electrical components are in their normal positions, there are intermittently closed electric circuits between said source of electrical energy 1 and lamps 11-R and 12-R, said lamps being positioned on the right rear of said vehicle, the flasher device 5 alternately opening and closing said electric circuits, electric resistance in said electric circuit to said lamp 11-R being minimized by potentiometric means 8, said potentiometric means making electrical contact at 8-A, said minimization of said electric resistance allowing sufficient energizing electric current to intermittently flow through said lamp 11-R to effect intermittent maximal illumination of the said lamp, light emanating toward the rear from said intermittently illuminated lamp 11-R being transmitted through translucent screen 15-R, said translucent screen containing a non-red colored pigment, said pigment causing said light to be further transmitted as non-red colored light; and further, said electric resistance in said electric circuit to said lamp 12-R being maximized by said potentiometric means 8, said maximization of said electric resistance minimizing intermittent flow of energizing electric current through said lamp 12-R, said minimal current flow being insufficient to effect illumination of said lamp 12-R. Thus, when only switch 4-R is actuated, a flashing non-red colored light, and only a flashing non-red colored light, is displayed on the right rear of the automotive vehicle. In the case that the brake actuation means is then actuated, said actuation actuating said brake light switch 2 and said potentiometric means 6, 7, and 8, said actuation of said brake light switch 2 closing electric circuits between said source of electrical energy 1 and said lamps 9-L, 9-R, 10-L, and 10-R, and said actuation of said potentiometric means 6 interposing maximal electric resistance into said electric circuits to lamps 10-L and 10-R, thereby preventing illumination of said lamps 10-L and 10-R, and further interposing minimal electric resistance into said electric circuits to said lamps 9-L and 9-R, thereby enabling maximal illumination of said lamps 9-L and 9-R, light emanating from said illuminated lamps being visible from behind said vehicle as red colored light; and further, there still being intermittently closed electric circuits between said source of electrical energy 1 and said lamps 11-R and 12-R, actuation of said potentiometric means 8, said potentiometric means making electrical contact at 8-B, interposing maximal electric resistance into said electric circuit to said lamp 11-R, said maximal electric resistance preventing flow of energizing electric current through said lamp 11-R sufficient to effect illumination of the said lamp, and further interposing minimal electric resistance into said electric circuit to said lamp 12-R, said minimal electric resistance enabling energizing electric current to intermittently flow through said lamp 12-R, said flow of energizing electric current being sufficient to effect intermittent maximal illumination of said lamp 12-R, light emanating toward the rear from said illuminated lamp being transmitted through translucent screen 16-R, said translucent screen containing a red colored pigment, said pigment causing said light to be further transmitted as red colored light. Thus, when the brake actuation means is actuated, the flashing non-red colored light on the right side of the vehicle is extinguished, a steady red colored brake signal light is displayed on each side of said vehicle, and a flashing red colored light is displayed on the right side of said vehicle. When the brake actuation means is released, said brake light switch 2 and said potentiometric means 6, 7, and 8 return to their normal positions, said return of said switch 2 opening said electric circuits between said source of electrical energy 1 and said lamps 9-L, 9-R, 10-L, and 10-R, thereby terminating illumination of said lamps 9-L and 9-R; and further, said return of said potentiometric means 8 interposing maximal electric resistance into said electric circuit to said lamp 12-R, said maximal electric resistance preventing flow of energizing electric current through said lamp 12-R sufficient to effect illumination of the said lamp, and further interposing minimal electric resistance into said electric circuit to said lamp 11-R, said minimal electric resistance enabling energizing electric current to again intermittently flow through said lamp 11-R, said intermittent current flow being sufficient to effect intermittent maximal illumination of said lamp 11-R, light emanating toward the rear from said intermittently illuminated lamp being transmitted through material containing a non-red colroed pigment. Thus, when said brake actuation means is released, the steady red colored brake signal light on each side of the vehicle, and the flashing red colored light on the right side of said vehicle, are extinguished, and the flashing non-red colored light on the right side of said vehicle is re-illuminated.

The function of left turn selector switch 4-L is exactly analogous to the function of said right turn selector switch 4-R. In the case that said left turn selector switch 4-L is actuated, and all other electrical components are in their normal positions, intermittent flow of energizing electric current effects intermittent maximal illumination of lamp 11-L, light emanating toward the rear from said intermittently illuminated lamp being transmitted through translucent screen 15-L, said translucent screen containing a non-red colored pigment. Thus, when only switch 4-L is actuated, only a flashing non-red colored light is displayed, said light being on the left rear of the vehicle. In the case that the brake actuation means is then actuated, said lamp 11-L is extinguished, and said lamps 9-L and 9-R are constantly illuminated, light emanating toward the rear from said lamps 9-L and 9-R being visible as red colored light, and further, lamp 12-L is intermittently illuminated, light emanating toward the rear from said illuminated lamp 12-L being transmitted through translucent screen 16-L, said translucent screen containing a red colored pigment. Thus, when the brake actuation means is actuated, the flashing non-red colored light on the left rear of the vehicle is extinguished, and a steady red colored brake signal light is displayed on each side of said vehicle, and a flashing red colored light is displayed on the left rear of said vehicle. When said brake actuation means is released, all said red colored lights are extinguished, and said flashing non-red colored light on the left rear of said vehicle is re-illuminated.

The over-all objective of the invention is to eliminate ambiguity in brake signaling by the rear lights of automotive vehicles, and to provide an immediately perceptible brake signal by said lights. As described above, this is accomplished in two parts: first, by illuminating specific lamps only when the brake actuation means of a vehicle is actuated, and by causing light emanating from said illuminated lamps to be transmitted as red colored light, said light color being immediately perceptible as the signal of braking; and second, by extinguishing non-red colored tail lights and rear turn signal lights during braking, thereby emphasizing the signal of braking provided by illuminated red colored lights, said extinguished non-red colored lights being re-illuminated upon release of said brake actuation means.

It is to be understood that the form of the invention herewith shown and described may comprise a preferred embodiment, but not the only possible form of the invention. Alternative means, such as coating rear lamps with material containing appropriately colored pigments, or fabricating the lamps themselves from material containing such pigments, might be used to impart color to light emanating from illuminated rear lamps. The number and arrangement of the rear lamps might differ from those shown in the figure. Electric switching means and electric resistance control means could either be directly, or indirectly, actuated by actuation of brake actuation means. Such various forms clearly fall within the spirit and scope of the current invention, as specified by the appended claims.

What is claimed is:

1. A method for displaying red colored light at the rear of an automotive vehicle only during braking, including the following components:

a source of electrical energy;

manually actuated left and right turn signal selector switches;

a turn signal flasher device for automatically opening and closing electric circuits between said source of electrical energy and said turn signal selector switches;

a manually actuated tail light switch;

manually actuated brake actuation means;

a brake light switch actuated by actuation of said brake actuation means;

lamps illuminated by the flow of energizing electric current to effect the tail lights of said vehicle, light emanating from said illuminated lamps being transmitted through material containing a non-red colored pigment;

lamps illuminated by the flow of energizing electric current to effect the brake signal lights of said vehicle, light emanating from said illuminated lamps being transmitted through material containing a red colored pigment;

lamps illuminated by intermittent flow of energizing electric current to effect flashing rear lights, light emanating from said intermittently illuminated lamps being transmitted through material containing a non-red colored pigment;

lamps illuminated by intermittent flow of energizing electric current to effect flashing rear lights, light emanating from said intermittently illuminated lamps being transmitted through material containing a red colored pigment; and, electrical conductor means by which said components are interconnected; said method comprising:

variable electric resistance means in the electric circuits between said source of electrical energy and said lamps, the magnitude of said electric resistance in each of said electric circuits being determined by resistance adjustment means, said resistance adjustment means being actuated by actuation of said brake actuation means, said actuation of said resistance adjustment means decreasing said electric resistance in said electric circuits to said lamps effecting red colored light, thereby enabling said lamps to be illuminated by the flow of energizing electric current, and increasing said electric resistance in said electric circuits to said lamps effecting non-red colored light, thereby preventing flow of sufficient energizing electric current through said circuits to effect illumination of said lamps, said effects of actuation of said resistance adjustment means on the said electric resistance in each of said electric circuits being reversed upon release of said brake actuation means.

* * * * *